United States Patent [19]

Sunano

[11] Patent Number: 4,996,522
[45] Date of Patent: Feb. 26, 1991

[54] FOLDING ELECTRONIC DEVICE
[75] Inventor: Hironori Sunano, Nara, Japan
[73] Assignee: Sharp Kabushiki Kaisha, Osaka, Japan
[21] Appl. No.: 408,274
[22] Filed: Sep. 18, 1989
[30] Foreign Application Priority Data Sep. 26, 1988 [JP] Japan .................. 63-125472[U]

[51] Int. Cl.$^5$ .................................... G09G 3/00
[52] U.S. Cl. ................. 340/700; 361/395; 361/398; 361/399; 364/708; 235/1 D; 220/334
[58] Field of Search .................. 340/407, 700; 439/31; 361/392, 394, 395, 398, 399, 413; 364/708; 235/1 D, 145 R; D18/7, 11; 220/334, 335, 240, 246

[56] References Cited
U.S. PATENT DOCUMENTS

| D. 243,250 | 2/1977 | Hazama | D26/5 C |
| D. 279,688 | 7/1985 | Kitai et al. | D18/7 |
| 4,517,660 | 5/1985 | Fashimoto et al. | 364/708 |
| 4,703,160 | 10/1987 | Narishima et al. | 235/1 D |
| 4,825,395 | 4/1989 | Kinser, Jr. et al. | 364/708 |

Primary Examiner—Joseph A. Orsino
Assistant Examiner—Brian R. Tumm
Attorney, Agent, or Firm—Birch, Stewart, Kolasch & Birch

[57] ABSTRACT

A folding electronic device comprises a body and a cover member, rear walls of which are rotatably coupled with each other by hinges. When the cover member is closed, the rear wall of the cover member is positioned rearwardly beyond the rear wall of the body while the lower end of the rear wall of the cover member is positioned downwardly beyond the upper end of the rear wall of the body. A clearance defined between the rear walls of the body and the cover member is blocked by a closing member which is provided in the body. A spring is mounted on the closing member to rearwardly urge the same. Due to the urging force of the spring, the closing member is in contact with the rear wall of the cover member when the cover member is closed and when the same is opened by 180°, as well as when the same is being opened/closed. Thus, no foreign matter enters the interior through the clearance defined between the rear walls of the body and the cover member to disconnect an interconnection sheet of the folding electronic device.

8 Claims, 7 Drawing Sheets

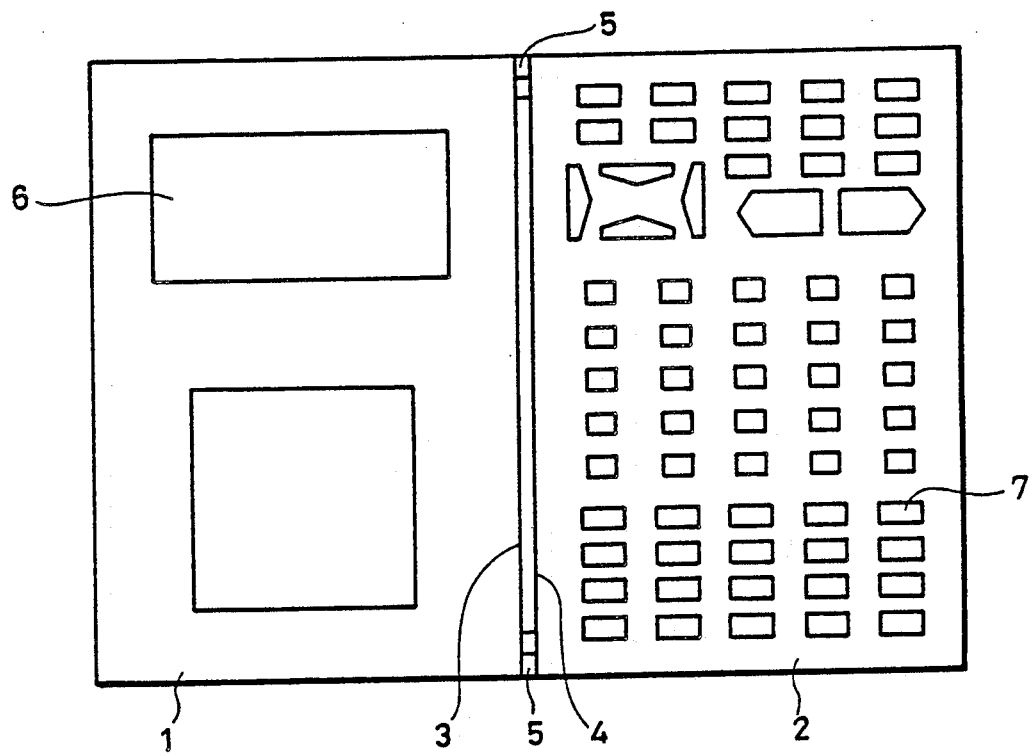
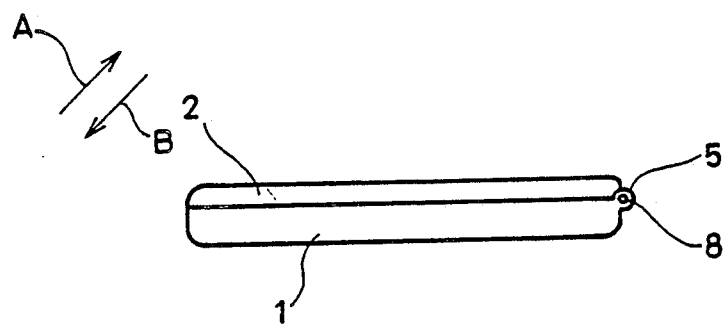
FIG.2 PRIOR ART

FOLDING ELECTRONIC DEVICE

BACKGROUND OF THE INVENTION

1. Field of the Invention

The present invention relates to a folding electronic device, and more particularly, it relates to a folding electronic device having a cover member which is opened/closed through hinges.

2. Description of the Background Art

A folding electronic device is generally applied to an electronic notebook, a pocket computer or the like. A conventional folding electronic device is now described with reference to FIGS. 1 to 5.

FIG. 1 is a plan view showing a conventional folding electronic device, whose cover member is opened. This folding electronic device comprises a body 1 and a cover member 2. A rear wall 3 of the body 1 is coupled with a rear wall 4 of the cover member 2 by hinges 5. The hinges 5 are mounted on both ends of the rear walls 3 and 4, so that the cover member 2 can be freely opened/closed with respect to the body 1.

The body 1 is provided with a display part 6, while the cover member 2 is provided with a number of operating keys 7. When the operating keys 7 are pressed, prescribed information appears on the display part 6.

FIG. 2 is a side elevational view showing the conventional folding electronic device, whose cover member 2 is closed. The cover member 2 is opened when the same is rotated about rotation axes 8 of the hinges 5 along an arrow A. On the other hand, the cover member 2 is closed when the same is rotated about the rotation axes 8 of the hinges 5 along another arrow B.

FIG. 3 is a bottom plan view showing the conventional folding electronic device whose cover member 2 is closed. The hinges 5 project from the rear wall 3 of the body 1.

FIG. 4 is a sectional view taken along the line IV—IV in FIG. 3.

The structure of the body 1 and that of the cover member 2 are now described in order.

As to the structure of the body 1, a space is defined between a lower wall 9 and an upper wall 10 thereof, to store a circuit substrate 11. The lower wall 9 of the body 1 is provided on its rear end with the rear wall 3, which upwardly projects toward the cover member 2. The upper wall 10 of the body 1 is provided with a through opening 15 in the vicinity of the rear wall 3.

As to the structure of the cover member 2, a space is defined between an upper wall 12 and a lower wall 13 thereof, to store another circuit substrate 14. The upper wall 12 of the cover member 2 is provided with the rear wall 4, which downwardly projects toward the body 1. The upper end of the rear wall 3 butts against the lower end of the rear wall 4. The lower wall 13 of the cover member 2 is provided with a through opening 16 in the vicinity of the rear wall 4. The circuit substrate 11 provided in the body 1 is electrically connected with the circuit substrate 14 provided in the cover member 2 by an interconnection sheet 17. The interconnection sheet 17 is passed through the through openings 15 and 16, to interconnect the body 1 with the cover member 2.

The rear wall 3 of the body 1 is rotatably coupled with the rear wall 4 of the cover member 2 by the hinges 5. The cover member 2 is rotated about the rotation axes 8 of the hinges 5 along the arrows A and B.

FIG. 5 is a rear elevational view showing the conventional folding electronic device, whose cover member 2 is closed.

In the conventional folding electronic device whose cover member 2 is opened/closed through the hinges 5, a clearance 18 is defined between the rear walls 3 and 4 of the body 1 and the cover member 2 as shown in FIG. 5, in order to smoothly open/close the cover member 2.

With such a clearance 18, however, the following problems (1) and (2) come into question:

(1) Foreign matter may enter the interior of the folding electronic device through the clearance 18, as shown in FIG. 4. Such foreign matter may scratch the interconnection sheet 17, to disconnect the same.

(2) As shown in FIG. 5, the clearance 18 spoils the appearance of the folding electronic device.

SUMMARY OF THE INVENTION

An object of the present invention is to provide a folding electronic device, which can prevent an interconnection member from disconnection.

Another object of the present invention is to provide a folding electronic device, whose appearance can be improved.

The inventive folding electronic device has the following structure:

In order to provide a body containing an electric circuit and a cover member containing another electric circuit to be freely opened/closed, a rear end portion of the body is rotatably coupled with that of the cover member by hinge.

The electric circuit provided in the body is electrically connected with that provided in the cover member through an interconnection member When the cover member is brought into a forward position about rotation axis of the hinge, the cover member vertically overlaps with the body to close the electronic device.

When the cover member is brought into a rear position about the rotation axis of the hinge, on the other hand, the electronic device is opened.

The cover member is provided on its rear end portion with a rear wall, which extends in the same direction as the rotation axis of the hinge and downwardly projects toward the body. The body is provided on its rear end portion with a rear wall, which extends in the same direction as the rotation axis of the hinge and upwardly projects toward the cover member.

When the electronic device is closed, the rear wall of the cover member is positioned rearwardly beyond that of the body. When the electronic device is closed, on the other hand, the lower end of the rear wall of the cover member is positioned downwardly beyond the upper end of the rear wall of the body.

The body is provided with a closing member, which rearwardly projects from the rear wall of the body to be in contact with the rear wall of the cover member. This closing member is displaceable.

The body is further provided with urging means which urges the closing member to retain the same in contact with the rear wall of the cover member.

The folding electronic device according to the present invention has the aforementioned structure.

When the cover member is closed, the folding electronic device is brought into the following state: The rear wall of the cover member is rearwardly displaced beyond that of the body. The lower end of the rear wall of the cover member is positioned downwardly beyond the upper end of the rear wall of the body. A clearance defined between the rear walls of the body and the cover member is filled up with the closing member, which rearwardly projects from the rear wall of the body to be in contact with the rear wall of the cover member. The urging means rearwardly urges the closing member to bring the same into contact with the rear wall of the cover member.

Thus, the clearance defined between the rear walls of the body and the cover member is blocked by the closing member when the cover member is closed.

Further, the closing member is rearwardly urged by the urging means to be in contact with the rear wall of the cover member. Thus, the clearance defined between the rear walls of the body and the cover member is blocked by the closing member also when the cover member is being opened/closed as well as when the same is opened by 180°. The cover member is opened by 180° in a working state of the folding electronic device.

Thus, the interconnection sheet is prevented from disconnection caused by foreign matter entering the interior of the folding electronic device from the clearance defined between the rear walls of the body and the cover member when the cover member is closed and when the same is opened by 180°, as well as when the same is being opened/closed.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a plan view showing a conventional folding electronic device, whose cover member is opened;

FIG. 2 is a side elevational view of the conventional folding electronic device, whose cover member is closed;

DESCRIPTION OF THE PREFERRED EMBODIMENTS

Figure 3:
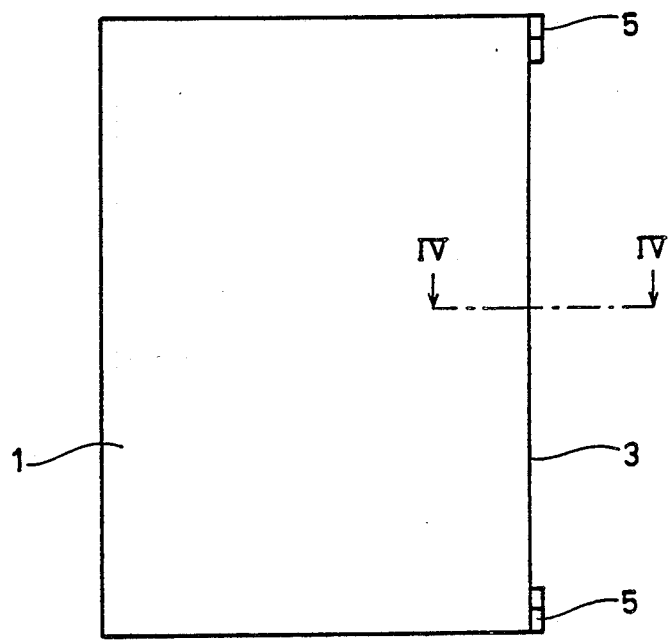
FIG. 3 is a bottom plan view of the conventional folding electronic device, whose cover member is closed.
Figure 4:
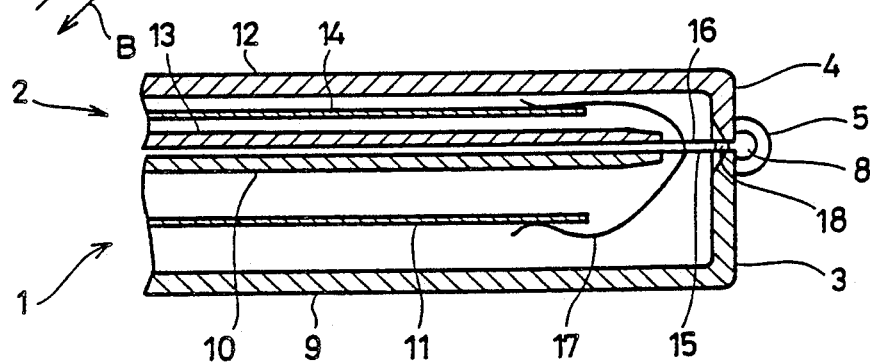
FIG. 4 is a partially fragmented sectional view taken along the line IV—IV in FIG. 3.
Figure 5:
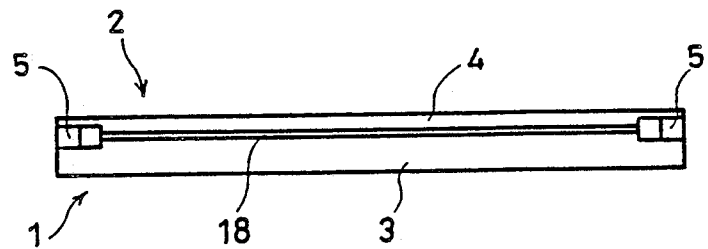
FIG. 5 is a rear elevational view of the conventional folding electronic device, whose cover member is closed.
Figure 6:
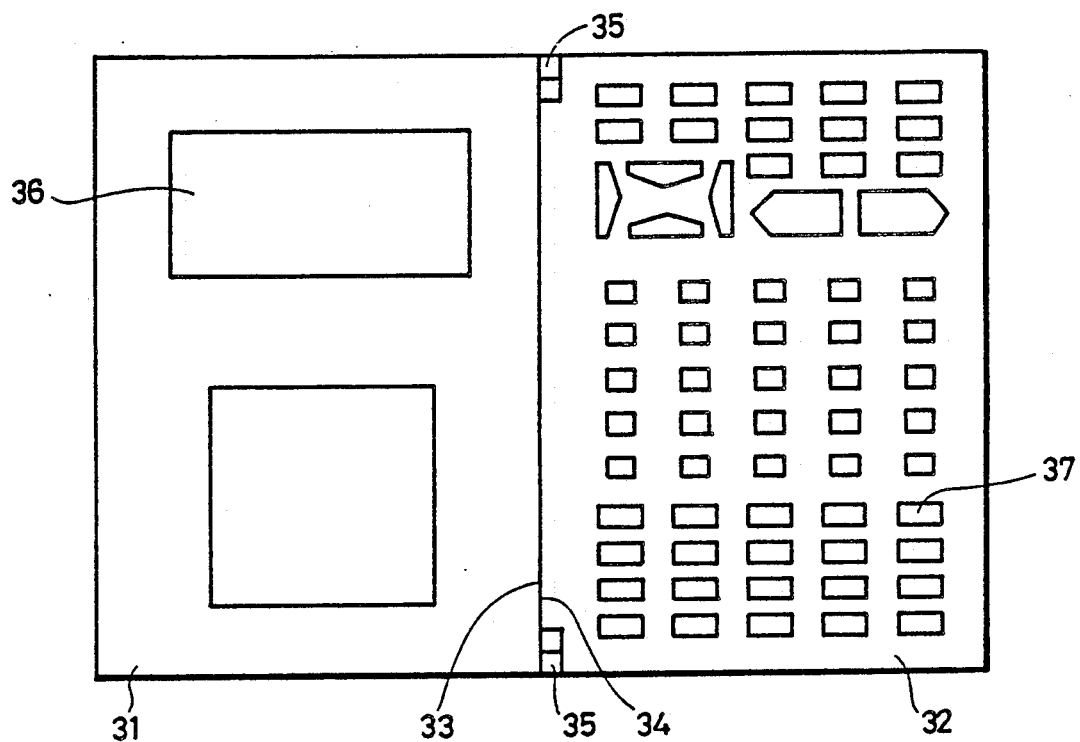
FIG. 6 is a plan view showing an embodiment of a folding electronic device according to the present invention, whose cover member is opened.

FIG. 6 is a plan view showing an embodiment of a folding electronic device according to the present invention, whose cover member is opened. This folding electronic device comprises a body 31 and a cover member 32. A rear wall 33 of the body 31 is coupled with a rear wall 34 of the cover member 32 by hinges 35, which are mounted on both ends of the rear walls 33 and 34. The cover member 32 can be freely opened/closed with respect to the body 31 through the hinges 35.

The body 31 is provided with a display part 36, while the cover member 32 is provided with a number of operating keys 37. When the operating keys 37 are pressed, prescribed information appears on the display part 36.

Figure 7:
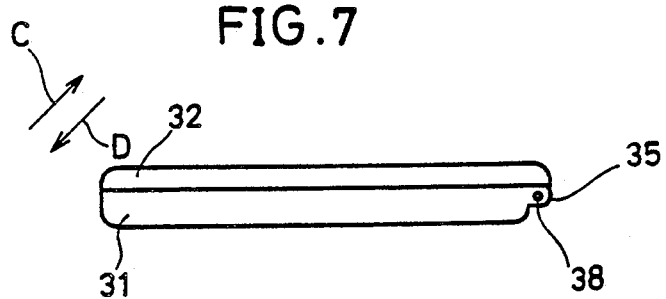
FIG. 7 is a side elevational view showing the embodiment of the folding electronic device according to the present invention, whose cover member is closed.

FIG. 7 is a side elevational view showing the embodiment of the folding electronic device according t the present invention, whose cover member 32 is closed. The cover member 32 is opened when the same is rotated about rotation axes 38 of the hinges 35 along an arrow C. On the other hand, the cover member 32 is closed when the same is rotated about the rotation axes 38 of the hinges 35 along another arrow D.

Figure 8:
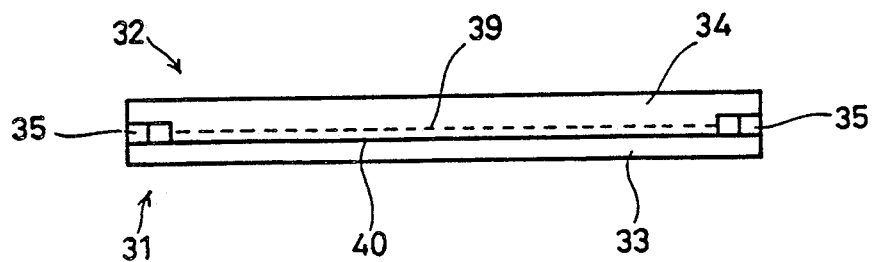
FIG. 8 is a rear elevational view showing the embodiment of the folding electronic device according to the present invention, whose cover member is closed.

FIG. 8 is a rear elevational view showing the embodiment of the folding electronic device according to the present invention, whose cover member 32 is closed. When the cover member 32 is thus closed, a lower end 40 of the rear wall 34 of the cover member 32 is positioned downwardly beyond an upper end 39 of the rear wall 33 of the body 31.

Figure 9:
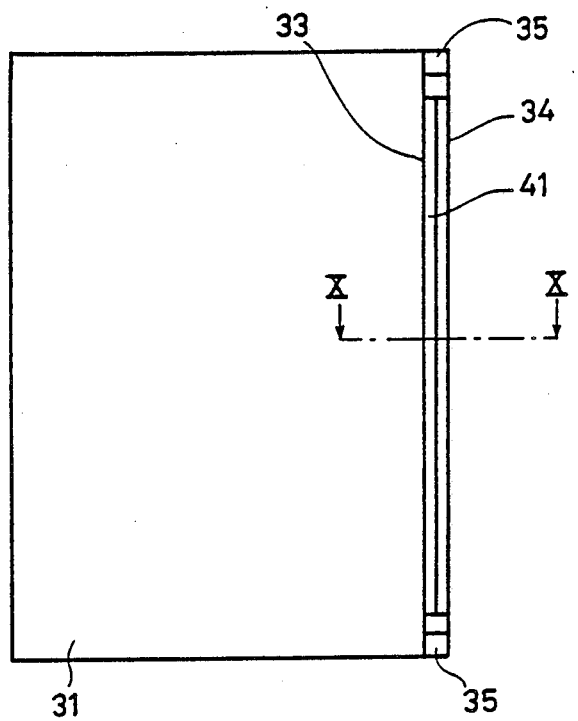
FIG. 9 is a bottom plan view showing the embodiment of the folding electronic device according to the present invention, whose cover member is closed.

FIG. 9 is a bottom plan view showing the embodiment of the folding electronic device according to the present invention, whose cover member 32 is closed. A closing member 41 is provided to fill up a clearance defined between the rear walls 33 and 34 of the body 31 and the cover member 32.

Figure 10:
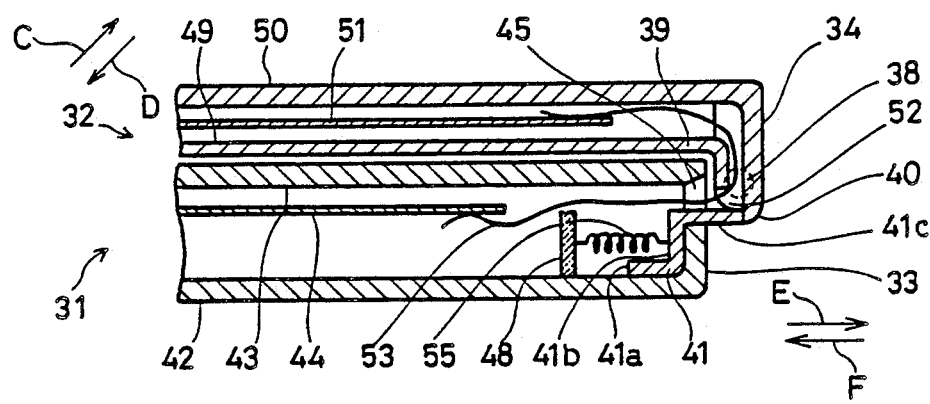
FIG. 10 is a partially fragmented sectional view taken along the line X—X in FIG. 9.

FIG. 10 is a partially fragmented sectional view taken along the line X—X in FIG. 9. The structure of the body 31, that of the cover member 32 and that of the closing member 41 are now described in order.

As to the structure of the body 31, a space is defined between a lower wall 42 and an upper wall 43 thereof, to store a circuit substrate 44. The rear wall 33 is provided between rear ends of the lower and upper walls 42 and 43 of the body 31. A through opening 45 is defined in the rear wall 33.

As to the structure of the cover member 32, a space is defined between an upper wall 50 and a lower wall 49 thereof, to store another circuit substrate 51. The upper wall 50 of the cover member 32 is provided on its rear end with the rear wall 34, which downwardly projects toward the body 31. The rear wall 34 of the cover member 32 is rearwardly displaced beyond the rear wall 33 of the body 31. Further, the lower end 40 of the rear wall 34 of the body 32 is positioned downwardly beyond the upper end 39 of the rear wall 33 of the body 31. The lower end 40 of the rear wall 34 of the cover member 32 has an arcuate end surface.

The lower wall 49 of the cover member 32 has a downwardly extending rear end, which is provided with a through opening 52. The circuit substrate 44 provided in the body 31 is electrically connected with the circuit substrate 51 provided in the cover member 32 through an interconnection sheet 53. The interconnection sheet 53 is passed through the through openings 45 and 52, to interconnect the body 31 with the cover member 32. The cover member 32 is rotated about the rotation axes 38 of the hinges along the arrows C and D.

As to the structure of the closing member 41, a spring support part 48 is upwardly provided on the lower wall 42 of the body 31. The closing member 41 is provided between this spring support part 48 and the rear wall 33, to be slidable along arrows E and F.

The closing member 41 is formed by a lower stage part 41a, an upwardly projecting part 41b and an upper stage part 41c. The lower stage part 41a slidably moves along the lower wall 42 of the body 31, and the upwardly projecting part 41b serves as a stopper. That is, when the upwardly projecting part 41b comes into contact with the inner surface of the rear wall 33 of the body 31, the closing member 41 cannot further move along the arrow E. The upper stage part 41c of the closing member 41 is adapted to block a clearance defined between the rear walls 33 and 34 of the body 31 and the cover member 32. A method of mounting the closing member 41 on the body 31 is now described with reference to FIG. 12.

Figure 12:
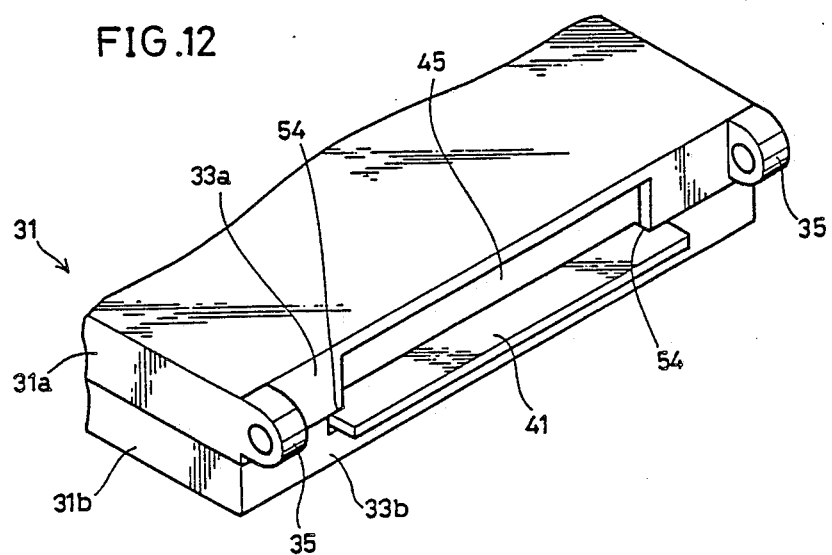
FIG. 12 is a partially fragmented perspective view showing a body of the embodiment of the folding electronic device according to the present invention.

FIG. 12 is a partially fragmented perspective view showing the body 31. The body 31 is formed by upper and lower cabinets 31a and 31b, which overlap with each other. The hinges 35 are mounted on both ends of a rear wall 33a of the upper cabinet 31a. A cavity is provided in the rear wall 33a of the upper cabinet 31a, and another cavity is provided in a rear wall 33b of the lower cabinet 31b, to define the through opening 45. The cavity provided in the rear wall 33b of the lower cabinet 31b is larger in width than that provided in the rear wall 33a of the upper cabinet 31a. The closing member 41 is retained by the cavity provided in the rear wall 33b of the lower cabinet 31b and an end surface 54 of the rear wall 33a of the upper cabinet 31a.

Referring again to FIG. 10, the spring support part 48 is coupled with the upwardly projecting part 41b of the closing member 41 by a coil spring 55. This coil spring 55 urges the closing member 41 along the arrow E. When the cover member 32 is closed, therefore, the end surface of the upper stage part 41c of the closing member 41 is in contact with the rear wall 34 of the cover member 32. Since the coil spring 55 thus urges the closing member 41 along the arrow E, the end surface of the upper stage part 41c of the closing member 41 also comes into contact with the rear wall 34 of the cover member 32 when the cover member 32 is being opened/closed as well as when the same is opened by 180°. This is now described with reference to FIG. 11.

Figure 11:
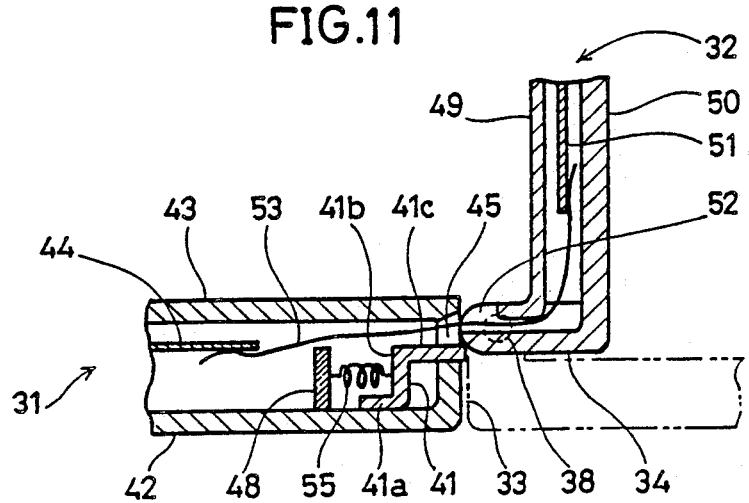
FIG. 11 is a partially fragmented sectional view showing opening/closing operation in the embodiment of the folding electronic device according to the present invention.

FIG. 11 is a partially fragmented sectional view showing such a state that the cover member 32 is opened by 90° in FIG. 10. Two-dot chain lines show the position of the cover member 32 which is opened by 180°. As shown in FIG. 11, the end surface of the upper stage part 41c of the closing member 41 is in contact with the rear wall 34 of the cover member 32 when the cover member 32 is being opened/closed as well as when the same is opened by 180°. Thus, the clearance defined between the rear walls 33 and 34 of the body 31 and the cover member 32 is regularly blocked by the closing member 41.

Figure 13:
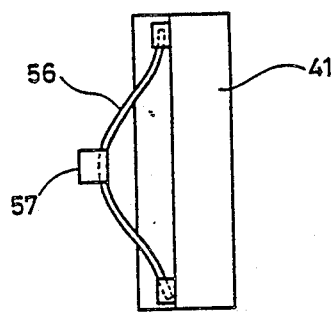
FIG. 13 is a plan view showing another example of urging means employed in the folding electronic device according to the present invention.
Figure 14:
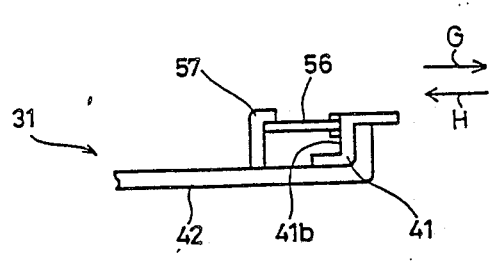
FIG. 14 is a side elevational view showing still another example of urging means employed in the folding electronic device according to the present invention.

An arched wire rod may also be employed as urging means. FIG. 13 is a plan view showing such an arched wire rod 56, which is mounted on a closing member 41. Both ends of this wire rod 56 are fixed to the closing member 41. A central portion of the wire rod 56 is held by a spring support part 57. On the other hand, FIG. 14 is a sectional view showing another arched wire rod 56, which is mounted on a closing member 41. Both ends of this wire rod 56 are mounted on an upwardly projecting part 41b of the closing member 41. The wire rod 56 urges the closing member 41 along an arrow G. The closing member 41 moves on a lower wall 42 of a body 31 along the arrow G and another arrow H.

Figure 15:
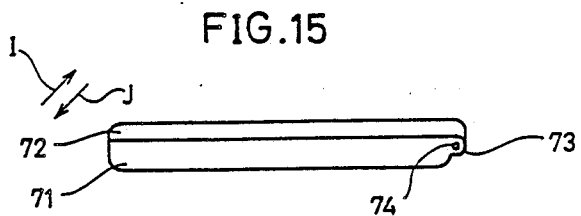
FIG. 15 is a side elevational view showing an exemplary improvement of a conventional folding electronic device, whose cover member is closed.

In the meantime, the inventor has also devised the following example as an improvement of a conventional folding electronic device. However, this improvement is also problematic. In this improvement, an exemplary vanity case is applied to the cabinet of the folding electronic device. This improvement is now described. FIG. 15 is a side elevational view showing an exemplary improvement of a conventional folding electronic device, whose cover member 72 is closed. The cover member 72 is opened when the same is rotated about rotation axes 74 of hinges 73 along an arrow I. On the other hand, the cover member 72 is closed when the same is rotated about the rotation axes 74 of the hinges 73 along another arrow J.

Figure 16:
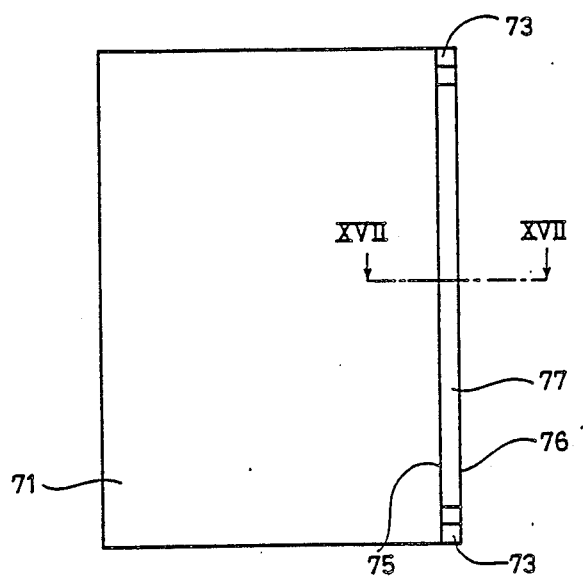
FIG. 16 is a bottom plan view showing the exemplary improvement of the conventional folding electronic device whose cover member is closed.

FIG. 16 is a bottom plan view showing the exemplary improvement of the conventional folding electronic device, whose cover member 72 is closed. A clearance defined between rear walls 75 and 76 of a body 71 and the cover member is blocked by a closing member 77.

Figure 17:
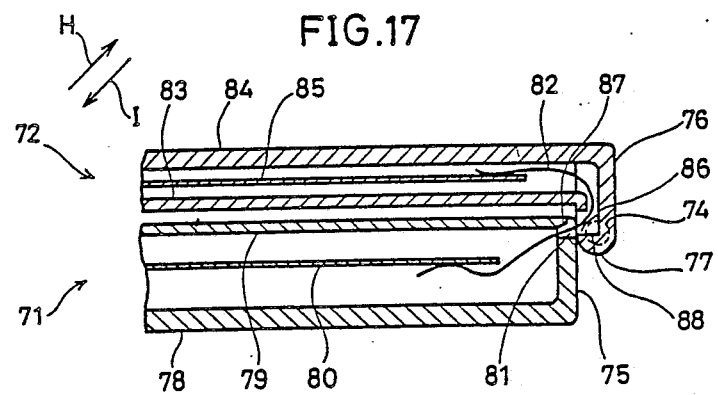
FIG. 17 is a partially fragmented sectional view taken along the line XVII—XVII in FIG. 16.

FIG. 17 is a partially fragmented sectional view taken along the line XVII—XVII in FIG. 16. Structure of the body 71, that of the cover member 72 and that of the closing member 77 are now described in order.

As to the structure of the body 71, a space is defined between a lower wall 78 and an upper wall 79 thereof, to store a circuit substrate 80. The rear wall 75 is provided between rear ends of the lower and upper walls 78 and 79 of the body 71. A through opening 81 is defined in the rear wall 75.

As to the structure of the cover member 72, a space is defined between an upper wall 84 and a lower wall 83 thereof, to store another circuit substrate 85. The upper wall 84 of the cover member 72 is provided on its rear end with the rear wall 76, which downwardly extends toward the body 71. The rear wall 76 of the cover member 72 is rearwardly displaced beyond the rear wall 75 of the body 71. Further, a lower end 88 of the rear wall 76 of the cover member 72 is positioned downwardly beyond an upper end 87 of the rear wall 75 of the body 71.

The lower wall 83 of the cover member 72 has a downwardly extending rear end, which is provided with a through opening 86. The circuit substrate 80 provided in the body 71 is electrically connected with the circuit substrate 85 provided in the cover member 72 by an interconnection sheet 82. The interconnection sheet 82 is passed through the through openings 81 and 86, to interconnect the body 71 with the cover member 72.

The cover member 72 is rotated about the rotation axes 74 of the hinges along arrows H and I.

The closing member 77 is now described. This closing member 77 is mounted on a lower end 88 of the rear wall 76 of the cover member 72, to block a clearance defined between the rear walls 75 and 76 of the body 71 and the cover member 72.

Figure 18:
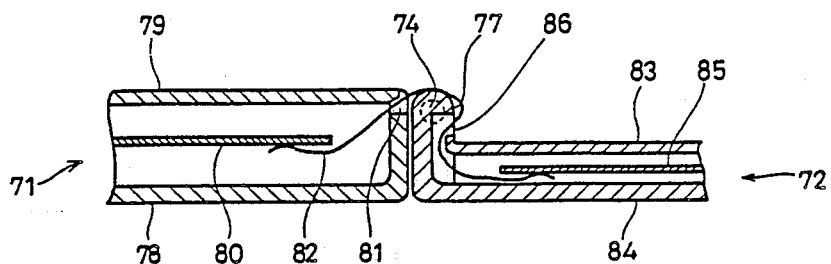
FIG. 18 is a partially fragmented sectional view illustrating the cover member shown in FIG. 17, which is rotated by 180°.

However, the following problem is caused by the closing member 77, which is mounted in the aforementioned manner: When the cover member 72 is opened by 180°, the closing member 77 may pull the interconnection sheet 82 as shown in FIG. 18, to disconnect the same.

Figure 19:
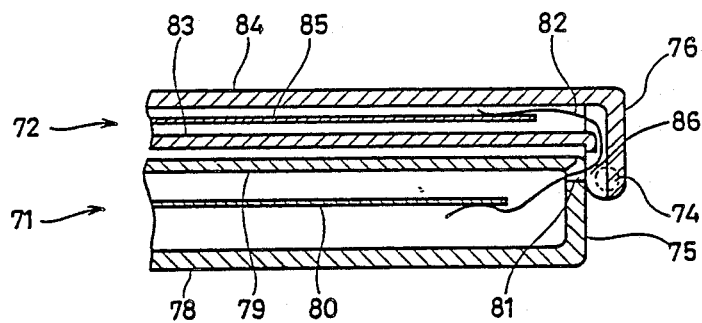
FIG. 19 is a partially fragmented sectional view showing another exemplary improvement of a conventional folding electronic device.
Figure 20:
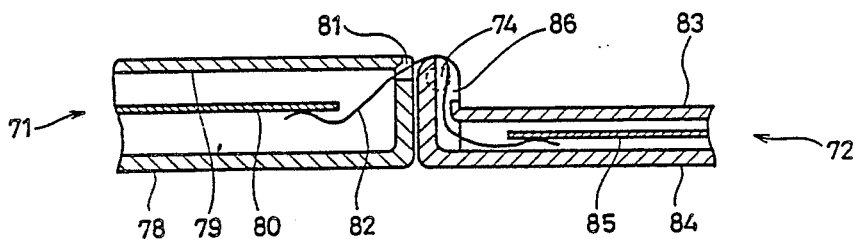
FIG. 20 is a partially fragmented sectional view illustrating the cover member shown in FIG. 19, which is rotated by 180°.

In order to prevent this, the closing member 77 may be removed from the rear wall 76 of the cover member 72 as shown in FIG. 19, so that no excessive force is applied to the interconnection sheet 82 when the cover member 72 is opened by 180° as shown in FIG. 20. If no closing member is provided, however, the clearance defined between the rear walls 75 and 76 of the body 71 and the cover member 72 cannot be blocked as shown in FIG. 19, and hence foreign matter may enter the interior of the folding electronic device through the clearance to disconnect the interconnection sheet 82.

An effect of the aforementioned embodiment of the present invention is now described.

According to the embodiment, the closing member 41 is provided in the clearance defined between the rear walls 33 and 34 of the body 31 and the cover member 32, as shown in FIG. 10. The closing member 41 is urged by the coil spring 55 along the arrow E, so that the end surface of the upper stage part 41c of the closing member 41 is in contact with the rear wall 34 of the cover member 32. Thus, the clearance defined between the rear walls 33 and 34 of the body 31 and the cover member 32 is blocked by the closing member 41.

Further, the closing member 41 is urged by the coil spring 55 along the arrow E so that the end surface of the upper stage part 41c of the closing member 41 is in contact with the rear wall 34 of the cover member 32 when the cover member 32 is being opened/closed as well as when the same is opened by 180°, as shown in FIG. 11. Thus, the clearance defined between the rear walls 33 and 34 of the body 31 and the cover member 32 is blocked by the closing member 41 when the cover member 32 is being opened/closed as well as when the same is opened by 180°.

Thus, no foreign matter enters the interior through the clearance defined between the rear walls 33 and 34 of the body 31 and the cover member 32 to disconnect the interconnection sheet 53 when the cover member 32 is closed and when the same is opened by 180°, as well as when the same is being opened/closed.

According to this embodiment, further, the clearance defined between the rear walls 33 and 34 of the body 31 and the cover member 32 is completely filled up with the closing member 41. Thus, the appearance of the folding electronic device is improved.

In addition, the lower end 40 of the rear wall 34 of the cover member 32 has an arcuate end surface according to the present invention, as shown in FIG. 10. Thus, the cover member 32 can be smoothly opened/closed.

According to this embodiment, the clearance defined between the rear walls 33 and 34 of the body 31 and the cover member 32 is completely filled up with the closing member 41, as shown in FIG. 9. However, the present invention is not restricted to this but the closing member may be provided only in a clearance part defined in the vicinity of the through openings 52 and 45 of the cover member 32 and the body 31, as shown in FIG. 10. The interconnection sheet 53 is also sufficiently protected by this.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A folding electronic device comprising a body containing an electric circuit; a cover member containing another electric circuit; a hinge rotatably connecting a rear end portion of said body with a rear end portion of said cover member for providing said body and said cover member to be freely opened/closed; and an interconnection member electrically connecting said electric circuit contained in said body with said electric circuit contained in said cover member, said cover member being brought into a forward position about a rotation axis of said hinge to vertically overlap with said body thereby to obtain a closed state of said electronic device, said cover member being brought into a rear position about said rotation axis of said hinge to obtain an opened state of said electronic device, said cover member being provided on its rear end portion with a rear wall extending in the same direction as said rotation axis of said hinge and downwardly projecting toward said body, said body being provided on its rear end portion with a rear wall extending in the same direction as said rotation axis of said hinge and upwardly projecting toward said cover member, said rear wall of said cover member being rearwardly displaced beyond said rear wall of said body, a lower end of said rear wall of said cover member being positioned downwardly beyond an upper end of said rear wall of said body in said closed state of said electronic device, said body further including:

a closing member displaceably provided to rearwardly project from said rear wall of said body to come into contact with said rear wall of said cover member, and urging means for urging said closing member to retain said closing member in contact with said rear wall of said cover member.

2. A folding electronic device in accordance with claim 1, wherein said closing member extends to fill up a clearance defined between said rear walls of said cover member and said body.

3. A folding electronic device in accordance with claim 1, wherein a through opening is defined in said rear wall of said body to pass said closing member.

4. A folding electronic device in accordance with claim 3, wherein
said interconnection member is passed through said through opening.

5. A folding electronic device in accordance with claim 1, wherein
said closing member is provided to be forwardly and rearwardly slidable, and
said urging means rearwardly urges said closing member.

6. A folding electronic device in accordance with claim 1, wherein
said closing member has a stopper part which comes into contact with an inner surface of said rear wall of said body thereby to define a terminal end of rearward movement of said closing member.

7. A folding electronic device in accordance with claim 1, wherein
said rear wall of said cover member being in contact with said closing member has an arcuate lower end surface.

8. A folding electronic device in accordance with claim 1, wherein
said cover member has operating keys and said body has a display part.

* * * * *